Feb. 2, 1932. A. FRUWIRTH 1,843,551
APPARATUS FOR PRODUCING ORNAMENTAL DESIGNS
Filed Nov. 12, 1928  3 Sheets-Sheet 1

INVENTOR.
A. Fruwirth
BY John D Morgan
ATTORNEY

Feb. 2, 1932.  A. FRUWIRTH  1,843,551
APPARATUS FOR PRODUCING ORNAMENTAL DESIGNS
Filed Nov. 12, 1928    3 Sheets-Sheet 2
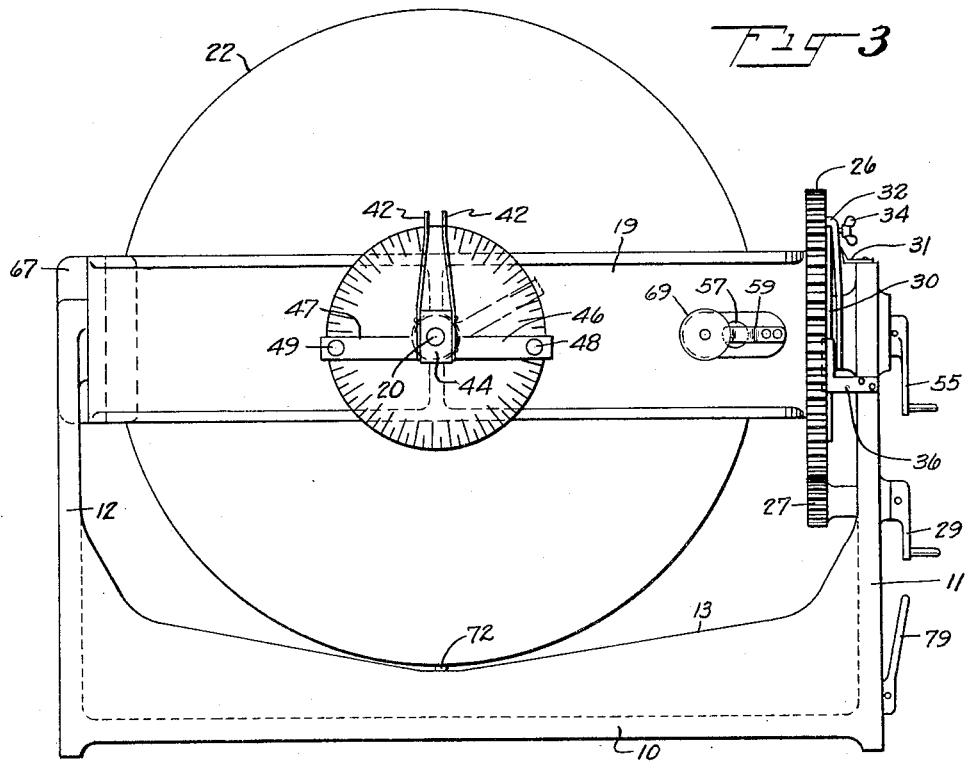
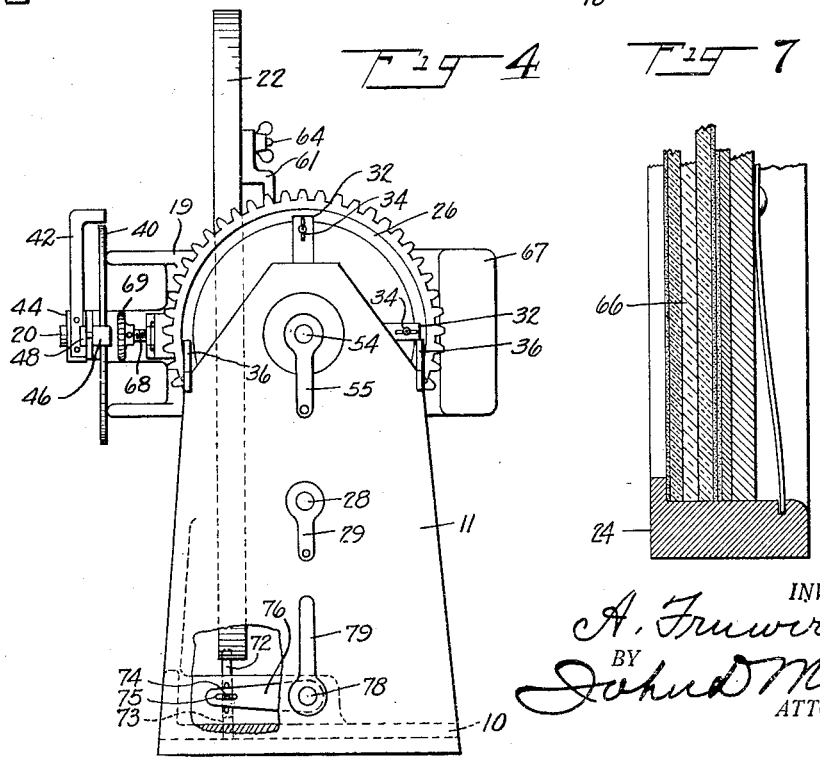
INVENTOR.
A. Fruwirth
BY John D. Morgan
ATTORNEY

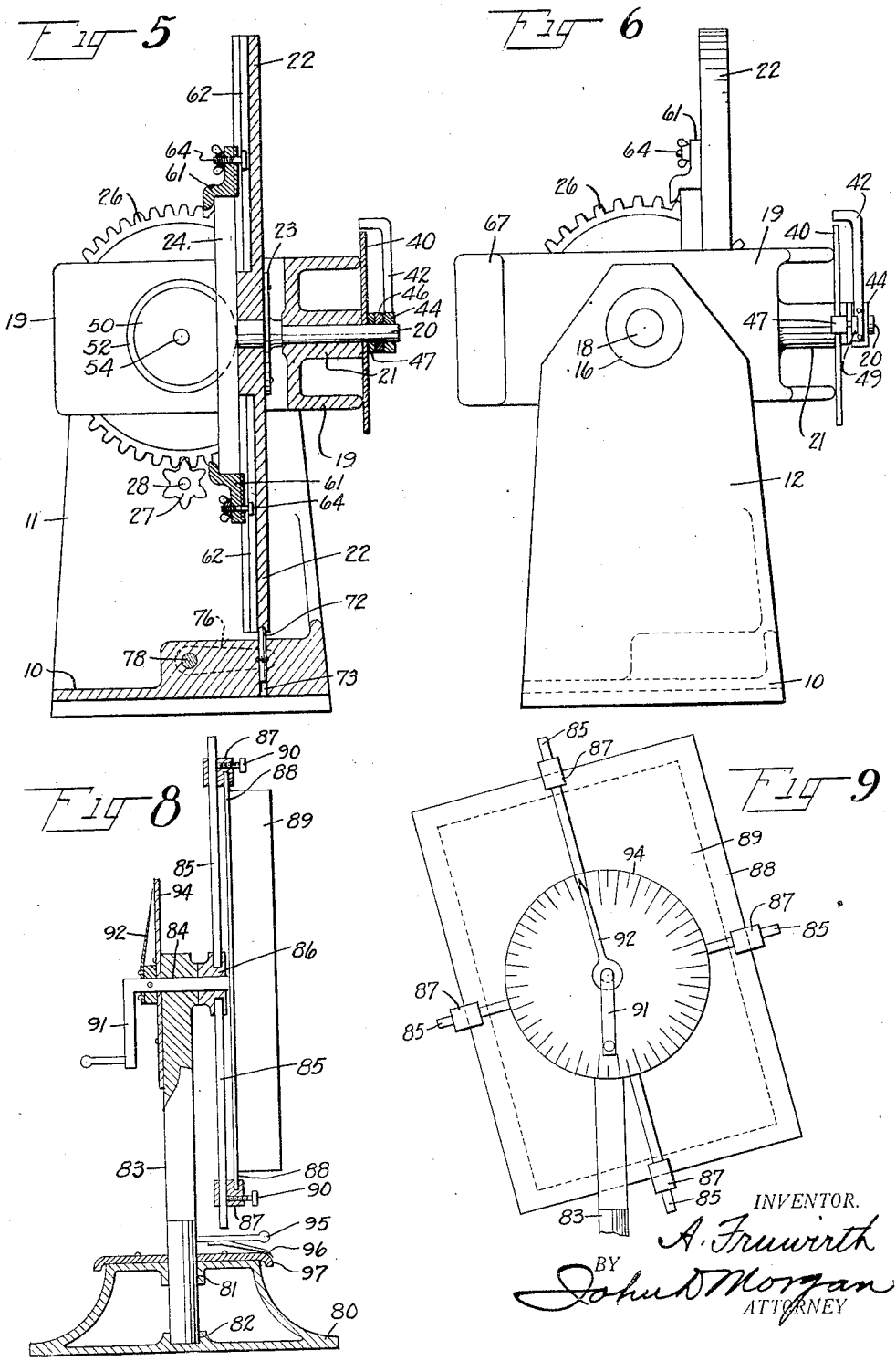

Patented Feb. 2, 1932

1,843,551

UNITED STATES PATENT OFFICE

ARTHUR FRUWIRTH, OF BROOKLYN, NEW YORK

APPARATUS FOR PRODUCING ORNAMENTAL DESIGNS

Application filed November 12, 1928. Serial No. 318,879.

My invention relates to novel and useful photomechanical apparatus and has for its particular object the provision of an instrumentality whereby a highly ornamental design bearing product may be produced from a comparatively simple design which product may be used for further reproduction, if so desired.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

In the drawings:

Fig. 3 is a rear elevation of the mechanism shown in Fig. 1;

Fig. 4 is an end view, looking from the left of Fig. 1;

Fig. 5 is a cross section taken on the line 5—5 of Fig. 1;

Fig. 6 is an end view of the machine shown in Fig. 1, looking from the right of said figure;

Fig. 7 is a cross section of one side of the holder taken on the line 7—7 of Fig. 1;

Fig. 8 is a side view of a somewhat simplified embodiment of my invention with certain parts broken away, and Fig. 9 is a detail view of certain parts shown in Fig. 8.

The invention is directed particularly to apparatus for carrying out processes of the type disclosed in Patent No. 1,677,965, issued to me, July 24, 1928, but is capable of being adapted to many other uses as will be obvious to those skilled in the art.

My process, as set forth in said patent, may be summarized as composed of the following principal steps:—A positive and a negative of a half-tone or line subject are assembled in registered relation, separated slightly from each other, either by air, a sheet of transparent material, or by an additional "texture" negative or positive, against a light sensitive surface, such as a sheet of photographic paper or a photosensitive plate. In this relation the assembly is exposed to a somewhat distant source of light while the angle of inclination of the assembly with respect to the rays of light is changed intermittently or continuously, or the assembly may be stationed obliquely with respect to the rays of light. After the necessary insolation, the photosensitive surface may be subjected to the customary and proper treatment to develop and/or permanentize the image.

The apparatus herein disclosed may be used in a somewhat similar manner with a single negative or positive through which the light can be passed with varying degrees of obliquity or it may even be used with unregistered complementary image forming members, lying in a plane normal or oblique to the beam of light.

In its broader aspects, the present embodiment comprises a holder for the image forming element or elements, whereby the elements may be held adjacent to or spaced from a photosensitive surface in registered or unregistered relation with each other. As desired, the image forming elements may be in effective contact with each other or may be placed in spaced relation and generally the image forming elements will be complementary, as for example a negative and a positive. This holder is so mounted that it can be rotated or oscillated with varying degrees of angular motion about one or more axes, whereby universal motion may be imparted to the image-forming elements and photosensitive surface either before or during the period of exposure. In addition, there may be provided means for indicating the extent of angular motion of the holder about one or each of its axes, whereby exact reproduction of the finished products may be facilitated, and stops may be provided to prevent any inadvertent or careless operation of the apparatus resulting in a failure to obtain the desired effect. Locking means may be provided, if desired, to retain the holder in any position, thereby permitting a plurality of exactly similar products to be expeditiously produced, when it is desired to operate the apparatus in certain manners.

It will be understood that the foregoing general description and the following detail description as well are illustrative and exemplary of the invention but are not restrictive thereof.

Figure 1:
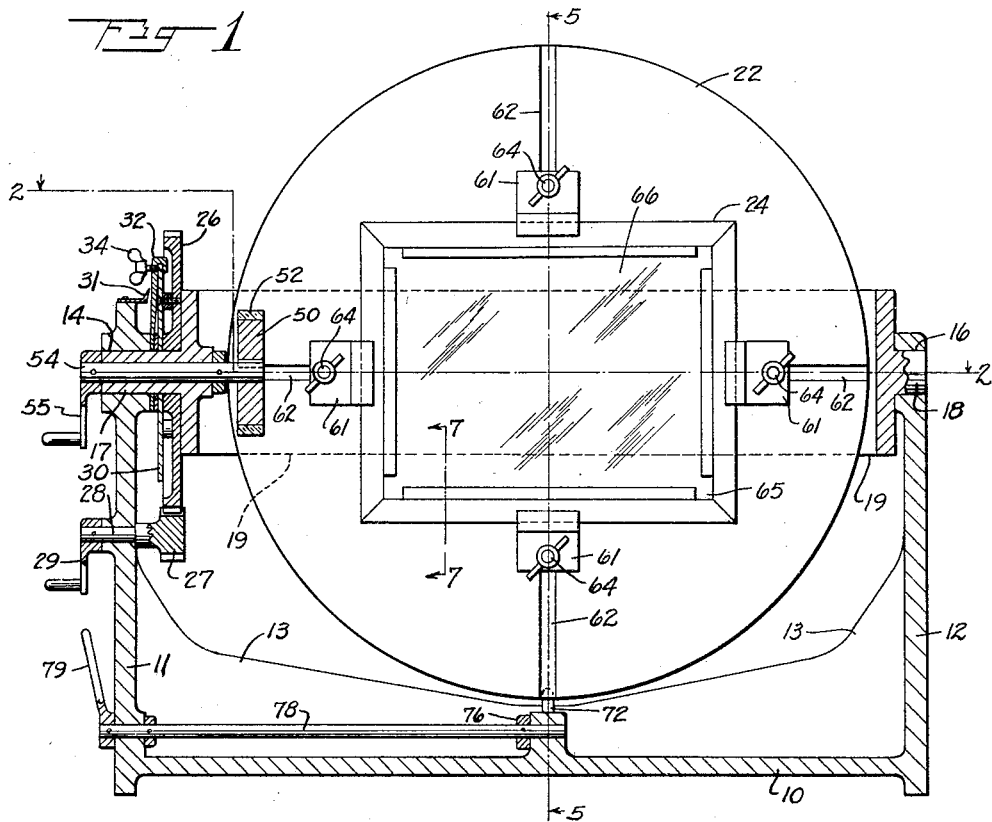
Fig. 1 is a front elevation of one embodiment of my invention, certain parts being shown in section.
Figure 2:
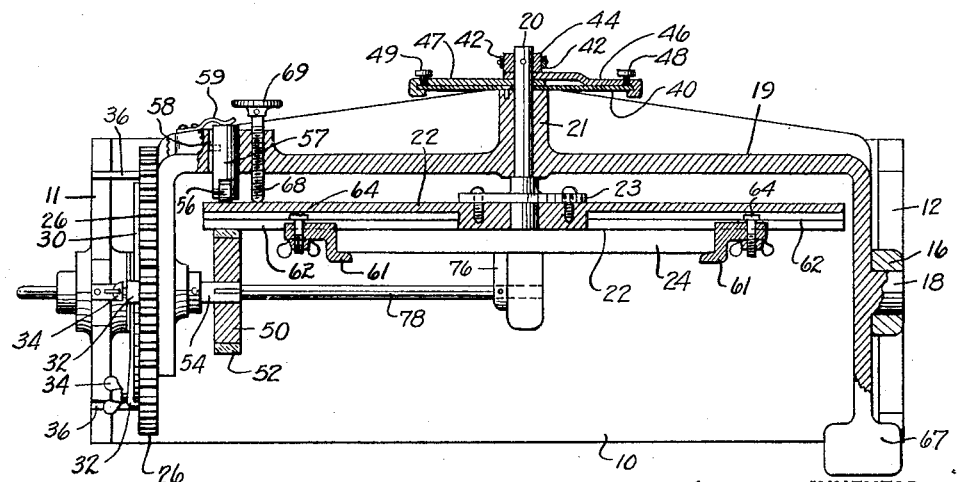
Fig. 2 is a cross section taken on the line 2—2 of Fig. 1.

In the embodiment of my invention shown by Figs. 1 to 6 of the drawings there is provided an elongated base member 10 from which rise two upright members 11 and 12, braced by web 13. At the upper portion of each of these members are formed alined bearings 14 and 16 respectively to receive and pivotally support the reduced end portions 17 and 18 of cradle 19, extending therebetween. A shaft 20 extends through the thickened mid-portion 21 of the cradle and at one end bears near a collar 23 to which is screwed a table 22 which is securing a holder 24. At one end of the cradle is mounted a gear 26 rigidly secured thereto in mesh with the pinion 27 on shaft 28, which may be turned by means of hand crank 29 pinned to the shaft. Gear 26 bears between it and the upright 11, a scale 30, graduated in degrees or other suitable division, which cooperates with pointer 31 affixed to upright 11 and indicates the angular position of the cradle and the holder carried thereby. On the reduced end portion 17 there are also mounted two radially extending arms 32 which may be held, in any angular position with respect to the scale and to each other, by means of set screws 34, which bars cooperate with stop members 36 mounted at each side of the upright 11 to limit the angular movement of the cradle about its axis.

Means for indicating the angular movement of the table 22 about its axis, and with respect to the cradle are provided and here shown as a graduated scale 40 on the rear side of the cradle and fastened thereto. Two substantially radially extending spring members 42 are secured to opposite sides of a block 44, pinned to shaft 20 which cooperate with the stationary scale 40 to indicate the angular movement of the table and also coact with radially extending, movable stop members 46 and 47, adjustably secured to the scale 40 by set screws 48 and 49 thereby to limit the angular movement of the table. Springs 42 also serve to absorb the shock produced by a too sudden arresting of the movement of the table about its axis and into engagement with stop 46 or 47.

For turning the table about the axis formed by the shaft 20, there is provided a wheel 50 having friction surface 52 and mounted on shaft 54 received within and concentric with the reduced end portion 17 of the cradle. To the outer end of shaft 54 there is pinned a hand crank 55 by which angular movement of the table is effected. To insure constant driving engagement of the table 22 with the roller 50, a small roller 56 mounted on one end of a member 57 slidably keyed in the cradle at 58 and resiliently urged against the rear face of the table by spring 59 is provided.

A holder 24 is adapted to receive the assembly of image forming elements 66, which may conveniently be glass plates bearing the negative and/or positive images of the original design, within the holder and between these elements and the table, the photosensitive sheet of paper or other surface which is to be transformed into the final design-bearing sheet. The image forming elements may be registered with each other, when so desired, by means of any two adjacent sides of the holder, as for instance, those sides joining at the corner 65, and generally will be spaced apart, as by an intercolated sheet of clear glass.

Means are provided for fixing the holder 24 to the face of the table 22 and in the present embodiment comprise movable clamps 61 variably positionable along undercut grooves 62 and maintained in the desired position by wing nuts 63 and the enlarged heads of bolts 64. By suitably positioning the clamps nearly any size of holder may be retained on the table and in substantially any position.

Forming an extension of one of the arms of the cradle 19, is a counter weight 67 which balances the cradle and eliminates any tendency of undesired rotation on the part of the table. As an additional means of maintaining the cradle in the desired position there is provided a threaded member 68 which may be turned by hand wheel 69 to press its rounded end into contact with the rear face of the table and thus hold it against rotation.

The cradle can be locked against rotation by means of pin 72 which seats in a recess formed in the periphery of the table. Pin 72 slides in a socket 73 formed in base 10 and from one side of the pin 72 there projects a smaller pin 74 through an elongated aperture in the socket. Pin 74 is received within slot 75 in lever 76 fixed to rod 78 which may be turned by handle 79 projecting pin 72 into a recess in the periphery of the table and holding the table, or withdrawing the pin and allowing the table to move freely.

A modified form of my invention is shown in Figs. 8 and 9, in which a base 80 provides upper and lower bearing surfaces 81 and 82 for a rotatable support 83. Near the top of support 83 is journaled a shaft 84 on one side of which are mounted arms 85 radially extending from hub 86. On each of these arms is slidably positioned a clamp 87 for rigidly retaining the reduced marginal portions 88 of a holder 89. Clamps 87 may be maintained in gripping relation with the holder by set screws 90, engaging with the arms 85.

Support 84 has pinned to it, on the other side of the support 83, a crank 91 by which the arms 85 and holder 89 may be rotated about the horizontal axis formed by shaft 84 and between the crank and support is rigidly fixed on the shaft a pointer 92 cooperating with scale 94 stationary with respect to the support 83. For moving the support 83 in its bearings 81, 82, to move the holder about a vertical axis there is provided a handle 95 projecting outwardly from the support 83. On this handle in mounted a second pointer 96, which, together with scale 97 on base 80 serves to indicate the angular movement or position of the holder with reference to its vertical axis of movement or oscillation.

In both modifications it will be noted that I have provided means for moving or oscillating the holder about two separate axes at right angles to each other, the extent of such movement being indicated by the several pointers cooperating with their respective scales. In this manner, the holder can be made to assume any desired angle with reference to a light source, somewhat removed, and all desirable effects can be produced. By suitable manipulation of the several cranks, the holder can be variably positioned about each of its several axes, prior to the exposure to light of the elements or the holder may be oscillated or rotated about its several axes during such exposure, such movement, of course, being determined by the subject at hand and the nature of the effect desired to be produced.

The invention in its broader aspects is not limited to the specific mechanisms shown and described but departures may be made therefrom within the scope of the accompanying claims without departing from the principles of the invention and without sacrificing its chief advantages.

What I claim is:—

1. A machine for producing ornamental designs for reproduction, including in combination means for holding a sensitized element and a plurality of complementary image forming elements, means for spacing the sensitized element and image forming element a small distance from each other, means for oscillating the holding means about an axis, means for indicating the extent of angular motion, and means for maintaining the holding means in the desired angular position.

2. A machine for producing ornamental designs for reproduction, including in combination means for holding a sensitized element and a plurality of complementary image forming elements, means for spacing the sensitized element and image forming element a small distance from each other, means for rotating the holding means about a plurality of axes at right angles to each other, means for limiting the extent of angular motion about each axis, and means for maintaining the holding means in the desired angular position whereby the sensitized element will receive the image formed by the image forming elements in modified form on exposure to light.

3. A machine for producing ornamental designs for reproduction, including in combination means for holding a sensitized element and an image forming element, means for spacing the sensitized element and image forming element a small distance from each other, means for registering said image forming element, means for oscillating the holding means about a plurality of axes, means for limiting the extent of angular motion about each axis, and means for indicating the extent of angular motion whereby the sensitized element will receive the image formed by the image forming elements in modified form on exposure to light.

4. A machine for producing ornamental designs for reproduction, including in combination means for holding a sensitized element and a plurality of complementary image forming elements, means for spacing the sensitized element and image forming element a small distance from each other, means allowing the ready removal and insertion of said elements, means for angularly moving the holding means about a plurality of axes, and means for limiting the extent of angular motion about each axis whereby the sensitized element will receive the image formed by the image forming elements in modified form on exposure to light.

5. A machine for producing ornamental designs for reproduction, including in combination means for holding a sensitized element and a plurality of image forming elements in spaced relation, means for spacing the sensitized element and image forming element, a small distance from each other, means allowing the ready removal and insertion of said elements, means for angularly moving the holding means about a plurality of axes, and means for indicating the extent of angular motion whereby the sensitized element will receive the image formed by the image forming elements in modified form on exposure to light.

6. A machine for producing ornamental designs for reproduction, including in combination means for holding a sensitized element and a plurality of image forming elements in spaced relation, means for spacing the sensitized element and image forming element a small distance from each other, means for registering said image forming elements, means for angularly moving the holding means about an axis, means for maintaining the holding means in the desired angular position, means for indicating the extent of angular motion, and means for limiting the extent of angular motion whereby the sensitized element will receive the image formed by the image forming elements in modified form on exposure to light.

7. A machine for producing ornamental designs for reproduction, including in combination means for holding a sensitized element and a plurality of complementary image forming elements, means for spacing the sensitized element and image forming element a small distance from each other, means for registering said image forming elements, means for angularly moving the holding means about a plurality of axes at right angles to each other, means for indicating the extent of angular motion about each axis, means for limiting the extent of angular motion about each axis, means for locking the holding means in a desired angular position and means allowing the ready removal and insertion of said elements, whereby, on exposure to a source of light, the sensitized element will receive in modified form the image formed by the image forming elements.

8. A machine for producing ornamental designs for reproduction including in combination means for holding a sensitized element and an image forming element, a rotatable member on which said means is mounted, and having its axis of rotation always perpendicular to said elements, a counterbalanced, oscillatable support on which said member is mounted, a pair of cranks adjacent to each other, one of said cranks being geared to the oscillatable support, while the other is geared to the rotatable member and stops for limiting rotation and oscillation of the member and support.

9. A machine for producing ornamental designs for reproduction including in combination means for holding a sensitized element and an image forming element, a rotatable member on which said means is mounted, and having its axis of rotation always perpendicular to said elements, an oscillatable support on which said member is mounted and having its axis of rotation perpendicular to said first axis, a frame in which said support is mounted, means on said frame for rotating said member and oscillating said support, a lock for holding the member and support against movement and means for operating said lock.

10. A machine for producing ornamental designs for reproduction including in combination means for holding a sensitized element and an image forming element, a rotatable member on which said means is mounted and having its axis of rotation always perpendicular to said elements, an oscillatable support on which said member is mounted and having its axis of rotation perpendicular to said first axis, a frame in which said support is mounted, means on said frame for rotating said member and oscillating said support, and stops for limiting rotation and oscillation of the member and support.

In testimony whereof, I have signed my name to this specification.

ARTHUR FRUWIRTH.